(12) United States Patent
Noichl et al.

(10) Patent No.: US 10,647,180 B2
(45) Date of Patent: *May 12, 2020

(54) OPERATING DEVICE FOR AN AIR VENT AND AIR VENT

(71) Applicant: Illinois Tool Works Inc., Glenview, IL (US)

(72) Inventors: Harald Noichl, Enkenbach-Aisenborn (DE); Frank Mootz, Heltersberg (DE)

(73) Assignee: Illinois Tool Works Inc., Glenview, IL (US)

( * ) Notice: Subject to any disclaimer, the term of this patent is extended or adjusted under 35 U.S.C. 154(b) by 167 days.

This patent is subject to a terminal disclaimer.

(21) Appl. No.: 15/889,774

(22) Filed: Feb. 6, 2018

(65) Prior Publication Data

US 2018/0162200 A1     Jun. 14, 2018

Related U.S. Application Data

(63) Continuation of application No. 14/283,251, filed on May 21, 2014, now Pat. No. 9,919,585.

(30) Foreign Application Priority Data

Jun. 7, 2013   (DE) .......................... 10 2013 105927

(51) Int. Cl.
*B60H 1/34* (2006.01)
*F24F 13/14* (2006.01)

(52) U.S. Cl.
CPC ....... *B60H 1/3421* (2013.01); *F24F 13/1426* (2013.01); *B60H 2001/3464* (2013.01); *B60H 2001/3471* (2013.01); *F24F 13/1486* (2013.01); *F24F 2013/1473* (2013.01)

(58) Field of Classification Search
CPC .................................................. B60H 1/3421
See application file for complete search history.

(56) References Cited

U.S. PATENT DOCUMENTS

| 3,602,127 A | 8/1971 | Walker |
| 5,690,550 A * | 11/1997 | Mikowski ............. B60H 1/345 454/155 |

FOREIGN PATENT DOCUMENTS

| CN | 102416844 A | 4/2012 |
| DE | 1327266 C1 | 8/1994 |
| DE | 10104428 A1 | 8/2002 |
| DE | 102009013256 A1 | 10/2009 |
| DE | 102007036532 B4 | 4/2011 |

(Continued)

*Primary Examiner* — Nathaniel Herzfeld
(74) *Attorney, Agent, or Firm* — Quarles & Brady LLP

(57) ABSTRACT

An operating device for an air vent which includes at least one swiveling vane, the operating device having a first operating lever which has a first lever arm, a second lever arm, and a bearing member which is arranged therebetween, the first operating lever being mounted around the bearing member for swiveling about a swivel pin, and a second operating lever which has a first lever arm, a second lever arm, and a bearing member which is arranged therebetween, the second operating lever being mounted around the bearing member for swiveling about a swivel pin, the first lever arm of the second operating lever being coupled to the second lever arm of the first operating lever and the second lever arm of the second operating lever being adapted to be coupled for swiveling motion to the vane.

20 Claims, 3 Drawing Sheets

(56) References Cited

FOREIGN PATENT DOCUMENTS

DE 102011050435 B4 8/2014
FR 2844484 B1 1/2006

* cited by examiner

OPERATING DEVICE FOR AN AIR VENT AND AIR VENT

RELATED APPLICATIONS

This application is a continuation of U.S. application Ser. No. 14/283,251, filed May 21, 2014, which claims priority to DE Application No. 10 2013 105 927.9, filed Jun. 7, 2013, both of which are hereby incorporated by reference in their entireties.

BACKGROUND OF THE INVENTION

The present invention relates to an operating device for an air vent including at least one swiveling vane. The invention further relates to an air vent.

Air vents having vanes for deflecting the airstream include, for example, a central operating member for swiveling the vanes. Where only one group of vanes is provided, with the vanes being parallel and coupled to each other, the operating member is attached directly to one of the vanes, so that by moving the operating member, the vanes can be swiveled directly in the direction in which the operating member is swiveled.

Where provision is made for two groups of vanes arranged one behind the other, for example perpendicular to each other, it is not possible to directly operate the vanes positioned at the rear as viewed from the interior of the vehicle because they are covered by the front vanes. But it is desirable for reasons of convenience to swivel both groups of vanes using one operating member.

For operating the rear vanes, provision is made in the prior art for a lever on the operating member, the lever projecting on the rear side and being coupled in an articulated fashion to a vane of the rear group of vanes. The lever is part of, or connected with, the operating member and is mounted jointly therewith at a front vane or in the air vent in an articulated fashion. When the operating member is swiveled, the rear vanes are swiveled by the lever in the opposite direction.

These operating devices have the drawback that the rear vanes are swiveled in opposition to the swivel direction of the operating member, whereas the swivel direction of the front vanes corresponds to the swivel direction of the operating member. This requires a frequent rethinking on the part of the vehicle occupant, which may cause the driver of the vehicle to be distracted.

SUMMARY OF THE INVENTION

It is an object of the invention to provide an operating device for an air vent which allows a simple and intuitive operation of an air vent. A further object of the invention is to provide an air vent having such an operating device.

To achieve the object, provision is made for an operating device for an air vent which includes at least one swiveling vane, the operating device including a first operating lever which has a first lever arm, a second lever arm, and a bearing member which is arranged therebetween, the first operating lever being mounted around the bearing member for swiveling about a swivel pin, and including a second operating lever which has a first lever arm, a second lever arm, and a bearing member which is arranged therebetween, the second operating lever being mounted around the bearing member for swiveling about a swivel pin. The first lever arm of the second operating lever is coupled to the second lever arm of the first operating lever, and the second lever arm of the second operating lever is adapted to be coupled for swiveling motion to the vane. Both operating levers can be mounted in the air vent with the bearing members, for example at a front vane as viewed from the interior of the vehicle. The mode of functioning of the first operating lever corresponds to that of a lever as is known from an air vent from the prior art, which is firmly connected with an operating element and can be swiveled jointly with it. According to the invention, a second operating lever is arranged between this first operating lever and the vane and can also be mounted for swiveling motion in the air vent. The second operating lever is connected for swiveling motion both with the first operating lever and the vane and can be swiveled about the bearing member. Since the second operating lever is coupled to the first operating lever, it is swiveled in opposition to the first operating lever, by analogy with the vane of an air vent known from the prior art. The vane coupled to the second operating lever is, in turn, swiveled in opposition to the second operating lever, that is, in the same direction as the first operating lever. This causes the vane to be swiveled each time in the swivel direction of the first operating lever or of an operating member provided on the first operating lever. As a result, this allows a more intuitive operation of an air vent having such an operating device since the swiveling of the vanes and, hence, the deflection of the air always occurs in the direction in which an operating member is swiveled.

Particularly in an air vent having two pairs of vanes that are perpendicular to each other, a considerably simpler operation is possible. The operating device is mounted, for example, on a front vane as viewed from the interior of the vehicle, the first operating lever being adapted to be operated from the interior of the vehicle. The front vane can be operated by swiveling the first operating lever and, thus, the entire operating device. By swiveling the first operating lever in the plane of the front vanes, the rear vane is adjusted by means of the operating device according to the invention, the rear vane likewise being adjusted each time in the swivel direction of the first operating lever. This means that both pairs of vanes are each time swiveled in the direction of actuation of the operating device, allowing an intuitive operation.

To make sure that the vane is swiveled exactly in opposition to the first operating lever, the swivel pins of the first and second operating levers are preferably arranged parallel to each other. In particular, the swivel pin of the vane which is coupled to the second lever arm of the second operating lever may also be arranged parallel to these swivel pins.

The operating levers may be mounted within the housing of the air vent or on a front vane as viewed from the interior of the vehicle. But it is also possible that a separate housing part is provided which includes a bearing seat for the bearing members of the first and second operating levers. This allows the operating device to be preassembled as a unit consisting of the first and second operating levers and of the housing part. This unit can then be mounted within the air vent, for example to a vane. This allows a considerably simpler and more rapid assembly of an air vent having such an operating device. Also, no additional bearing seats for the operating levers are needed on the air vent.

The bearing seats each include, for example, an insertion section and a locking mechanism for the bearing members. The operating levers may simply be pushed into the insertion sections until they lock in place in the bearing seats, so that the bearing members can be simply assembled with no tools needed.

To fix the housing part in place in the air vent, for example on a vane, the housing part, in particular on the outer periphery thereof, includes holding members intended for fitting the housing part to the air vent. These holding members may more particularly be locking members, so that the housing part may be simply inserted into the air vent and be locked in place therein.

Coupling the first to the second operating lever and coupling the second operating lever to the vane can be effected in any suitable manner. However, changes in lengths appear due to the changes in the angles between the operating levers and between the two operating levers and the vane, so that a coupling having a length compensation in the longitudinal direction of the operating levers is of advantage. To this end, preferably the first lever arm of the second operating lever or the second lever arm of the first operating lever has a forked-shaped seat provided thereon, and the second lever arm of the first operating lever or the first lever arm of the second operating lever has a pivot provided thereon which projects into the forked-shaped seat and is mounted therein for rotation and for displacement in the longitudinal direction of the seat. The operating levers are thereby coupled to each other for swiveling motion. But a length compensation is possible nonetheless by shifting the pivot in the forked-shaped seat in the longitudinal direction. This type of coupling further has the advantage that the operating levers can be simply mounted to each other by pushing them into each other from opposite directions, for example from opposite sides of a housing part.

The coupling of the second operating lever to the vane is also effected, for example, by means of a forked-shaped seat and a pivot which projects into the forked-shaped seat. The forked-shaped seat is preferably provided on the second operating lever. This means that the second lever arm of the second operating lever may also have a forked-shaped seat provided thereon which receives a pivot provided on the vane, or may have a pivot provided thereon which engages in a forked-shaped seat provided on the vane.

The bearing members may be bearing pins, for example, which extend in the longitudinal direction of the swivel pins.

The swivel pins of the first and second operating levers and that of the vane are preferably arranged parallel to each other and more particularly lie in one plane. In the direction of flow of the air vent towards the vehicle interior the swivel pins of the operating levers are preferably located upstream of the vane, with the swivel pin of the first operating lever being closest to the vehicle interior, so that the first operating lever can be adjusted from the vehicle interior.

Such an air vent may also have at least one second swiveling vane provided thereon, the swivel pin of the second vane being more particularly arranged transverse to the swivel pin of the first vane, and the second vane being arranged downstream of the first vane in the direction of flow of the air vent.

In such an embodiment, the bearing seats for the bearing members are provided on the second vane, for example. That is, the operating levers are swivel-mounted on the second vane. As a result, a direct swiveling of the second vane is possible by swiveling the first operating lever in a first direction of actuation, perpendicular to the plane of the second vane or the swivel pin of the second vane. The first vane is swiveled by swiveling in a second direction of actuation, perpendicular to the first direction of actuation, i.e. in the plane of the second vane. This operating device thus allows the two vanes to be swiveled separately from each other, the swiveling direction of the vanes in each case corresponding to the swiveling direction of the first operating lever.

The bearing seats may be provided directly on the second vane. But it is also possible that the second vane has a housing part provided thereon which has the bearing seats for the bearing members of the first and second operating levers. This allows the operating device to be preassembled and subsequently applied to the second vane.

BRIEF DESCRIPTION OF THE DRAWINGS

Further advantages and features will be apparent from the description below, given in conjunction with the accompanying drawings, in which.

DESCRIPTION OF EMBODIMENTS

Figure 1:
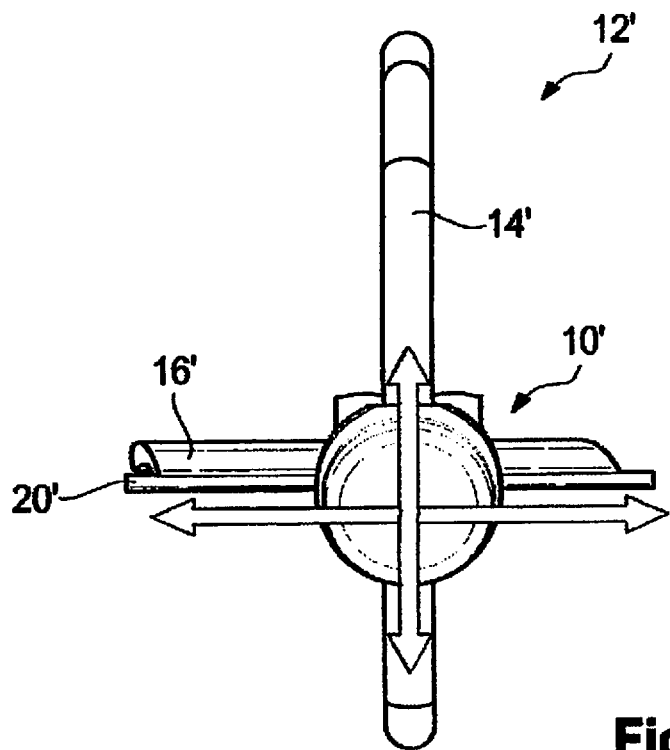
FIG. 1 shows a front view of an operating device from the prior art.
Figure 2:
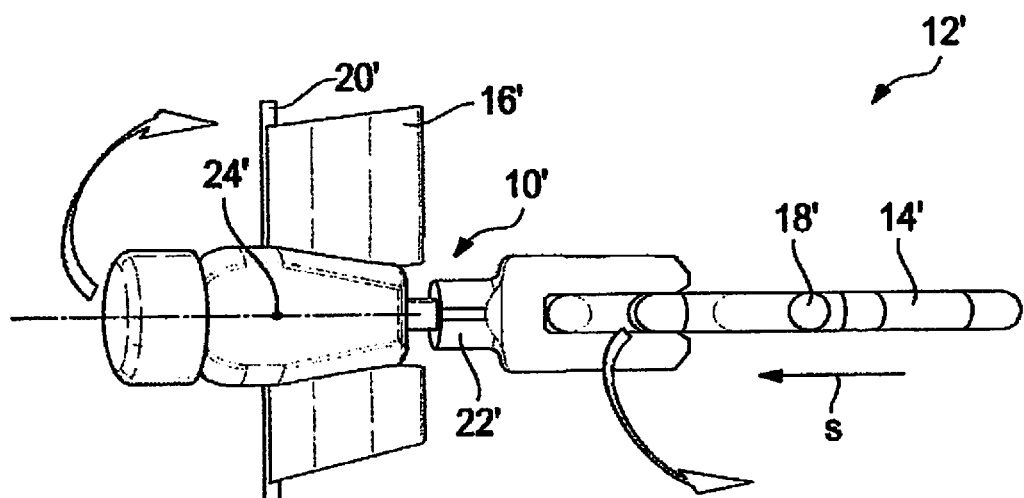
FIG. 2 shows a top view of the operating member of FIG. 1.

FIGS. 1 and 2 show an operating device 10' from the prior art in an air vent 12' of which only parts are illustrated here. The air vent 12' has a first, rear vent 14' as viewed from the vehicle interior and a second, front vane 16' as viewed from the vehicle interior. The two vanes are each adapted to be swiveled about a swivel pin 18', 20'.

The air vent 12' includes further vanes, not illustrated here, which are arranged parallel to the first and second vanes 14', 16', respectively. The parallel vanes are each coupled to the first or to the second vane 14', 16', so that they can be swiveled jointly with the first or the second vane 14', 16'.

The operating device 10' includes an operating lever 22' which is mounted on the second vane 16' for swiveling about a swivel pin 24'. As is shown in FIG. 2, the operating lever 22' is coupled for swiveling motion to the first vane 14'.

When the operating lever 22' is swiveled upwards or downwards in relation to FIG. 1, the second vane 16' coupled to the operating lever 22' is moved up or down together with the operating lever 22' about the swivel pin 20'. The swivel direction of the vane 16' thus corresponds to the swivel direction of the operating lever 22'.

In order to operate the first vane 14' located behind the second vane 16', the operating lever 22' is swiveled about its swivel pin 24' on the second vane 16', i.e. in the plane of the second vane 16'. As can be seen in FIG. 2, when the operating lever 22' is swiveled, the first vane 14', however, is swiveled about the swivel pin 18' oppositely to the operating lever 22'.

Therefore, the swivel direction of the first vane 14' and thus the direction of deflection of the airstream is each time in opposition to the swivel direction of the operating lever 22', whereas when the second vane 16' is operated, the swivel direction of the operating lever 22' corresponds to the swivel direction of the second vane 16'. Thus, depending on which of the vanes 14', 16' is operated by the vehicle occupant, that is, the first vanes 14' or the second vanes 16', the vehicle occupant needs to rethink whether he/she needs to move the operating lever in the desired direction of the airstream or contrary thereto.

The operating device for an air vent, illustrated in FIGS. 3 to 6, eliminates this drawback.

Figure 3:
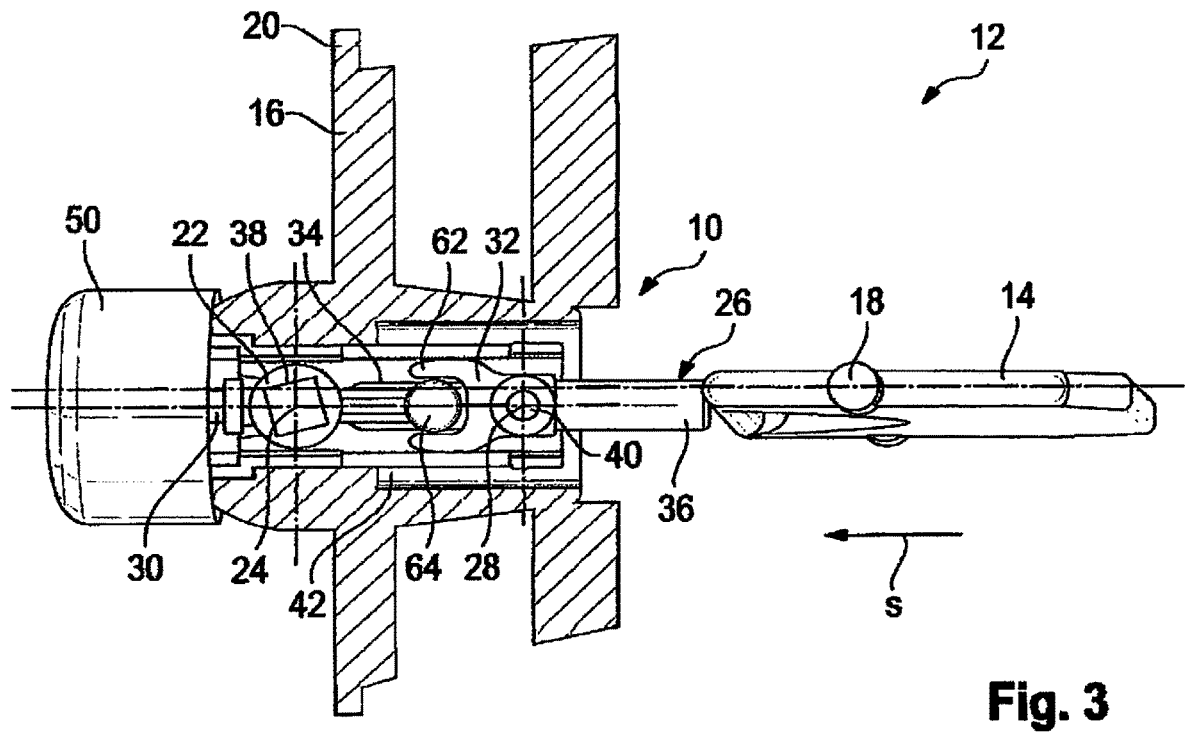
FIG. 3 shows a top view of an air vent according to the invention with an operating member according to the invention.
Figure 4:
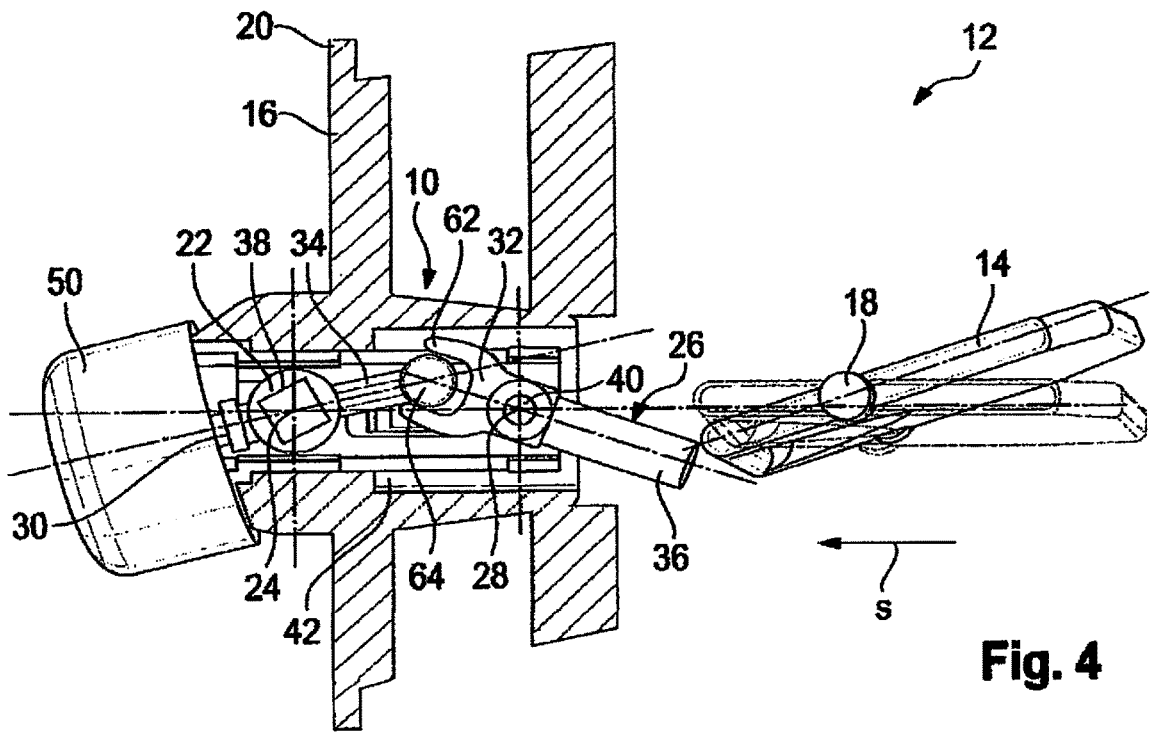
FIG. 4 shows the air vent of FIG. 3 with the operating device in a swiveled state.

The air vent 12, parts of which are shown in FIGS. 3 and 4, also has two groups of vanes, with parallel vanes which are coupled to each other and can therefore be swiveled jointly. For reasons of clarity, only the first vane 14 and the second vane 16 are shown here, which are coupled to the operating device 10.

To this end, the operating device 10 according to the invention includes a first operating lever 22 and a second operating lever 26. Each of the operating levers includes a first lever arm 30, 32 and a second lever arm 34, 36. A respective bearing member 38, 40 is provided between the first lever arm 30, 32 and the second lever arm 34, 36 and, as can be seen in particular in FIG. 5, includes a bearing pin 39, 41. These bearing members 38, 40 serve to mount the first operating lever 22 and, respectively, the second operating lever 26 for swiveling motion about a respective swivel pin 24, 28 (FIGS. 3 and 4).

In this embodiment, the swivel pins 24, 28 are arranged parallel to each other and, in a neutral position of the second vane 16, parallel to the swivel pin 18 of the first vane 14. Further, as can be seen in particular in FIG. 3, all three swivel pins 24, 28, 18 are arranged in one plane, the swivel pin of the first vane being arranged upstream in the flow direction S, and the swivel pin 24 of the first operating lever 22 being arranged downstream in the flow direction S. The swivel pin 28 of the second operating lever 26 is arranged between the swivel pins 18, 24.

The operating device 10 further includes a housing part 42 which has bearing seats 44, 46 provided therein for the bearing members 38, 40 of the operating levers 22, 26. This housing part 42 is inserted in a recess 48 on the second vane 16 contrary to the flow direction S, that is, from the front as viewed from the vehicle interior, and is fixed in place therein.

Further provided on the first lever arm 30 of the first operating lever 22 is an operating knob 50.

The second vane 16, at which the operating device 10 is held, is operated analogously to the air vent 12' from the prior art as shown in FIGS. 1 and 2.

Figure 5:
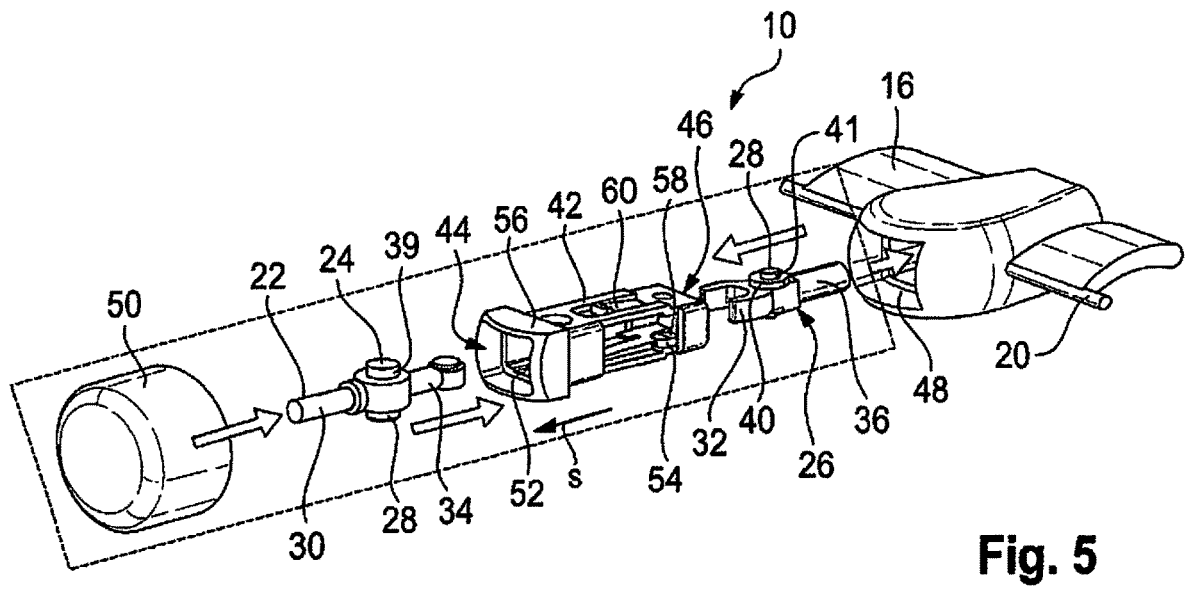
FIG. 5 shows an exploded view of the operating member of the air vent of FIG. 3.
Figure 6:
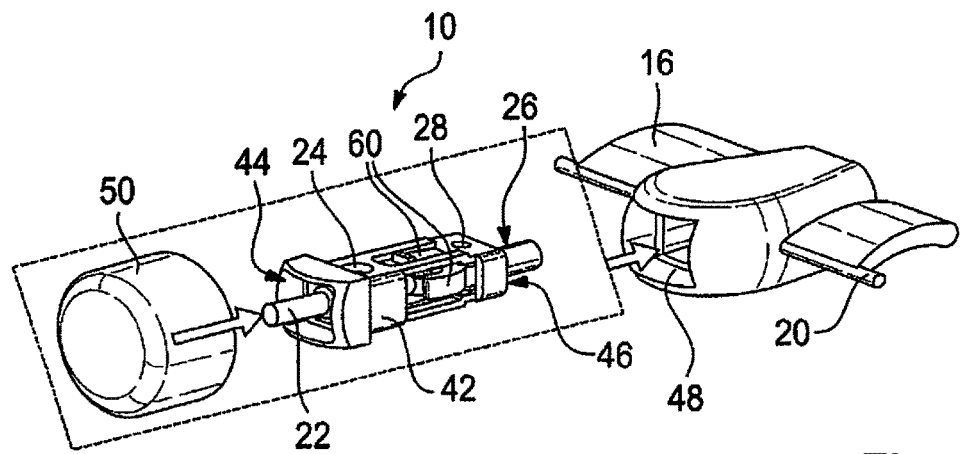
FIG. 6 shows the operating member of FIG. 5 in an assembled state.

The first operating lever 22 or the operating knob 50 are swiveled upwards or downwards with respect to FIGS. 5 and 6, causing the second vane 16 to be swiveled about its swivel pin 20 jointly with the first operating lever 22.

When the operating knob on the second vane 16 is swiveled in a swivel direction in the plane of the second vane 16 to swivel the first vane 14, the second operating lever is swiveled in opposition to the swivel direction S (FIG. 4). The vane 14, which is coupled to the second operating lever 26, is swiveled in opposition to the second operating lever 26, i.e. in the same swivel direction as the first operating lever 22.

As against the prior art according to FIGS. 1 and 2, the swivel direction of the vane is thus reversed by the second operating lever 26 which, in a way, serves as a transfer or conversion lever, so that this swivel direction is identical with the swivel direction of the first operating lever 22 and the operating knob 50.

This allows a considerably more intuitive and quicker operation of an air vent 12 since, for both vanes 14, 16, the swivel direction of the first operating lever 22 and of the operating knob 50 corresponds to the swivel direction of the vanes 14, 16.

The length of the lever arms 30, 32, 34, 36 and the position of the bearing members 38, 40 at the operating levers 22, 26 can be selected as desired, to obtain a desired transmission ratio between the swiveling of the operating knob 50 and the swiveling of the vane 14. For example, with a suitable transmission ratio the vane 14 can be swiveled at the same swivel angle as the operating knob 50. But it is also conceivable that a small swivel angle of the operating knob 50 leads to a very large swiveling of the vane 14.

As can be seen in FIGS. 5 and 6, the operating device 10 consisting of the first operating lever 22, the second operating lever 26, the housing part 42, and the operating knob 50 can be preassembled. Only then is the operating device 10 mounted to the second vane 16 and coupled to the vane 14 by inserting it into the recess 28 on the second vane 16 contrary to the flow direction S, that is, from the front as viewed from the vehicle interior.

For a simple assembly of the operating device 10, the bearing seats 44, 46 each have insertion slopes 52, 54 provided thereon for the operating levers 22, 26 or the bearing members 38, 40 of the operating levers 22, 26. The bearing members 38, 40 are each fixed in place in the housing part 42 by means of a locking mechanism 56, 58 formed by locking members, allowing the operating levers 22, 26 to be mounted in the housing part 42 without a tool.

Furthermore, locking members 60 are provided on the outer periphery of the housing part 42, for fitting the housing part 42 in the recess 48 on the second vane 16.

The coupling of the first and second operating levers is effected by means of a fork-shaped seat 62 which, in the embodiment shown here, is provided on the first lever arm 32 of the second operating lever 26 (FIGS. 3 and 4). Provided on the second lever arm 34 of the first operating lever 22 is a pivot 64 which is both swivel-mounted in the fork-shaped seat 62 and also mounted for being shifted in the longitudinal direction of the fork-shaped seat 62. This mounting allows a swiveling coupling of the operating levers 22, 26, the fork-shaped seat 62 also permitting a length compensation when the first and second operating levers 22, 26 are swiveled (see FIG. 4). The fork-shaped seat 62 may, however, also be provided on the second lever arm of the first operating lever, and the pivot 64 may be provided on the first lever arm of the second operating lever 26.

This coupling additionally offers the advantage that a simple assembly is possible by inserting the pivot 64 into the fork-shaped seat in the longitudinal direction. The operating levers 22, 26 may be coupled to each other, for example, if they are inserted into the housing part 42 from different directions.

The coupling of the vane 14 to the second operating lever 26 is effected in the same way, but is not illustrated in detail here. By analogy with the coupling of the operating levers 22, 26, the second operating lever can simply engage with the vane 14 when the housing part 42 is pushed into the recess 48.

Unlike the embodiment illustrated here, the operating levers 22, 26 may also be mounted directly at the second vane 16 without the housing part 42. More particularly, it is also conceivable that the air vent 12 includes only one group of vanes; in this case, the operating device 10 may be attached to the air vent.

What is claimed is:

1. An operating device for an air vent that includes at least one first swiveling vane, the operating device comprising:

a first operating lever including a first lever arm, a second lever arm that is opposite from and coaxial with the first lever arm, and a first bearing member between the first lever arm and the second lever arm, the first operating lever mounted around the first bearing member for swiveling about a first swivel pin, wherein the first lever arm and the second lever arm remain coaxial during swiveling motion; and a second operating lever including a third lever arm, a fourth lever arm that is opposite from and coaxial with the third lever arm, and a second bearing member between the third and fourth lever arms, the second operating lever mounted around the second bearing member for swiveling about a second swivel pin, wherein the third lever arm and the fourth lever arm remain coaxial during swiveling motion, wherein the third lever arm of the second operating lever is coupled to the second lever arm of the first operating lever, and the fourth lever arm of the second operating lever is adapted to be coupled for swiveling motion to the at least one first swiveling vane.

2. The operating device of claim 1, wherein the third lever arm of the second operating lever is directly coupled to the second lever arm of the first operating lever.

3. The operating device of claim 1, wherein the first and second swivel pins are parallel to each other.

4. The operating device of claim 1, further comprising a housing part which includes first and second bearing seats for the first and second bearing members of the first and second operating levers.

5. The operating device of claim 4, wherein the first and second bearing seats each include an insertion section and a locking mechanism for the first and second bearing members.

6. The operating device of claim 4, wherein the housing part comprises locking members on an outer periphery for fitting the housing part to the air vent.

7. The operating device of claim 1, wherein the third lever arm of the second operating lever or the second lever arm of the first operating lever has a forked-shaped seat provided thereon and the second lever arm of the first operating lever or the third lever arm of the second operating lever has a pivot provided thereon which projects into the forked-shaped seat and is mounted therein for rotation and for displacement in the longitudinal direction of the forked-shaped seat.

8. The operating device of claim 1, wherein the first and second bearing members include bearing pins.

9. The operating device of claim 1, wherein the first lever arm of the first operating lever has an operating knob provided thereon.

10. The operating device of claim 1, further comprising an operating knob connected to the first operating lever.

11. An air vent comprising the at least one first swiveling vane of the operating device of claim 1, the fourth lever arm of the second operating lever of the operating device being coupled for swiveling motion to the at least one first swiveling vane.

12. The air vent of claim 11, wherein the first and second swivel pins of the first and second operating levers and a third swivel pin of the at least one first swiveling vane lie in one plane.

13. The air vent of claim 12, further comprising at least one second swiveling vane a fourth swivel pin of the at least one second swiveling vane being arranged transverse to the third swivel pin of the at least one first swiveling vane, and the second swiveling vane being arranged downstream of the first swiveling vane.

14. The air vent of claim 13, wherein the at least one second swiveling vane has bearing seats provided thereon for the first and second bearing members of the first and second operating levers.

15. The air vent of claim 13, wherein the at least one second swiveling vane has a housing part provided thereon which has first and second bearing seats for the first and second bearing members of the first and second operating levers.

16. An operating device for an air vent having at least one first swiveling vane, the operating device comprising:

a first operating lever including a first lever arm, a second lever arm that is opposite from and coaxial with the first lever arm, and a first bearing member between the first lever arm and the second lever arm, the first operating lever mounted around the first bearing member for swiveling about a first swivel pin, wherein the first lever arm and the second lever arm remain coaxial during swiveling motion; and an operating knob directly connected to the first operating lever.

17. The operating device of claim 16, wherein the operating knob is centered with respect to the at least one first swiveling vane.

18. The operating device of claim 16, wherein the at least one first swiveling vane comprises a first swiveling vane and a second swiveling vane, wherein the operating knob is centered with respect to both the first swiveling vane and the second swiveling vane.

19. The operating device of claim 16, wherein the at least one swiveling vane comprise a front vane and a rear vane, and wherein the operating knob is centered with respect to the front vane and the rear vane.

20. The operating device of claim 16, further comprising:

a second operating lever including a third lever arm, a fourth lever arm that is opposite from and coaxial with the third lever arm, and a second bearing member between the third and fourth lever arms, the second operating lever mounted around the second bearing member for swiveling about a second swivel pin, wherein the third lever arm of the second operating lever is coupled to the second lever arm of the first operating lever, and the fourth lever arm of the second operating lever is adapted to be coupled for swiveling motion to the at least one first swiveling vane.

\* \* \* \* \*